United States Patent [19]
Burns et al.

[11] 4,354,102
[45] Oct. 12, 1982

[54] CURSOR APPARATUS FOR INTERACTIVE GRAPHIC DISPLAY SYSTEM

[75] Inventors: Richard H. Burns, North Hollywood; Michael R. Smith, Thousand Oaks; Irving J. Bell, Canoga Park; Kenneth Crabtree, Saugus, all of Calif.

[73] Assignee: The United States of America as represented by the Secretary of the Air Force, Washington, D.C.

[21] Appl. No.: 206,414

[22] Filed: Nov. 13, 1980

[51] Int. Cl.$^3$ .................................................. G01J 1/20
[52] U.S. Cl. ....................................... 250/201; 340/710
[58] Field of Search ............ 250/201, 203 R, 203 CT, 250/549, 234, 235; 340/709, 710

[56] References Cited

U.S. PATENT DOCUMENTS

| | | | |
|---|---|---|---|
| 3,997,891 | 12/1976 | Iwamura et al. | 250/549 |
| 4,152,586 | 5/1979 | Elliott et al. | 250/201 |
| 4,318,096 | 3/1982 | Thornburg et al. | 340/710 |

*Primary Examiner*—David C. Nelms
*Attorney, Agent, or Firm*—Donald J. Singer; Willard R. Matthews, Jr.

[57] ABSTRACT

Graphic data entry in an interactive graphic display system is achieved by means of an apparatus that provides automatic centering of a pointing laser beam on a hand held cursor. The graphic display system provides a means for displaying and comparing through superposition full size overlaid graphical data and projected graphical data on a common display screen. It includes a steerable pointing laser the beam of which scans the display screen in response to a laser beam deflection circuit. The system also includes laser beam position sensing and indicating circuits which accurately measure the laser beam position. Centering of the laser beam on the cursor at the display screen is accomplished by dithering the beam uniformly about its average position in a discrete dither pattern and utilizing the dither pattern to determine misalignment of the beam's average position with respect to the center of the cursor. The cursor includes photo detector elements that are geometrically configured to conform to the dither pattern so that signals derived from an eccentric relationship of the beam dither pattern and the photo detector element configuration can be processed to provide beam misalignment direction and magnitude error signals. These error signals drive a servo system that centers the average beam position on the cursor. The function of the cursor is to manually or automatically measure the coordinator of graphical features on the display screen.

9 Claims, 13 Drawing Figures

CURSOR APPARATUS FOR INTERACTIVE GRAPHIC DISPLAY SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to interactive graphic display systems and in particular to cursor apparatus for providing graphic data entry in such systems.

Graphic display systems are used to process maps and other similar graphical information sources and generally include a console having a display screen and a flying spot type indicating and feature tracing means for tracing and performing interactive editing of displays. As such, there is commonly required a direct data coordination interaction between display surface and a digital feature file. Graphic data entry is a necessary feature of the interactive graphic display. This is required in order to enter new information into the digital data base as well as to designate already digitized features for the purpose of requesting additional information, modification, shifting, or removal.

The required information can be obtained by use of a sensor or movable cursor. State-of-the-art devices of this type are represented by the "quad cell" type sensor disclosed in the U.S. patents: *Beam Detector Detector* Hans Sorensen, U.S. Pat. No. 3,435,232; *Optical Prism With Multiple Photo Cells,* G. K. Nutz et al., U.S. Pat. No. 3,478,219; *Light Sensing Device Having Polyhedra Reflectors and a Photomultiplier With Segmented Photocathode,* H. L. Mondpar, U.S. Pat. No. 3,654,475; *Direct Measurements of Ship Body Distortion Using a Laser Beam,* G. W. Cook et al., U.S. Pat. No. 3,790,276; and *Apparatus For Automatic Tracking of Pupil Of Eye,* Ludwig Leity, U.S. Pat. No. 3,806,725.

In all the above concepts, the attitude of the sensor must be carefully controlled. Rotation of the sensor will reduce the servo loop gain, induce cross coupling between x and y channels, and even reverse the polarity of the feedback causing complete failure of the beam tracking servo. Such a restriction on sensor attitude is not desirable for a hand held cursor as it requires some sort of sliding mechanical arm to prevent the operator from rotating the cursor. The device described herein is a sensor with circular symmetry and may be picked up and held against the screen without operator's concern for proper rotation. Such an approach which uses a small circular dither rather than a full raster as one would use on a CRT with a light pen has various advantages. For instance, the circular dither makes more efficient use of the available pointing laser power and deflector bandwidth as the pointing beam only deviates from the sensor enough to indicate the direction and sign of pointing errors. In a raster scanning system, large deflection bandwidths are required tocover the entire screen at speeds above the flicker rate of the eye. In addition, a raster scan would waste most of the laser power by directing it to parts of the screen that are not of interest.

SUMMARY OF THE INVENTION

The hand held cursor of the invention is used with and effects an integral function of an interactive cartographic display system. Systems of this type include a large screen projection display and an accurately steerable pointing laser. In accordance with the principles of the invention x-y position data are entered into a digital feature file from the screen by means of the hand held cursor. The pointing laser is constantly dithered about an average position which is accurately known. The cursor contains one or two photodetectors. When it is placed on the screen near the image of the pointing laser, the cursor produces a modulated output resulting from the dither pattern. Appropriate synchronous demodulation of the cursor output yields error signals which indicate the direction and magnitude of the misalignment between cursor and dither pattern. These error signals are used to close a servo loop centering the pointing laser upon the cursor.

In one preferred embodiment of the invention the dither pattern is a small circle produced by sine and cosine signals. The cursor is photosensitive over a circular area the same size as the dither circle. When the dither circle is aligned to the cursor, the beam maintains a constant overlap with the photosensor, producing constant output. When the censor is shifted slightly, the amount of overlap varies with position around the circle resulting in a modulated photosensor output. The magnitude of the modulation indicates the magnitude of the misalignment while the phase indicates the direction.

It is a principal object of the invention to provide new and improved cursor apparatus for interactive graphic display systems.

It is another object of the invention to provide a hand held cursor for effecting a direct data coordination interaction between the display surface of a cartographic display system and a digital feature file.

It is another object of the invention to provide a hand held cursor having circular symmetry and that may be utilized in cartographic display systems without concern for orientation or rotation.

It is another object of the invention to provide a hand held cursor of the type described that has small size and mass.

It is another object of the invention to provide a hand held cursor of the type described that makes efficient use of the available pointing laser power and deflector bandwidths.

These together with other objects, features and advantages of the invention will become more readily apparent from the following detailed description taken in conjunction with the illustrative embodiment in the accompanying drawings wherein like elements are given like reference numerals throughout.

DETAILED DESCRIPTION OF THE PREFERRED EMBODIMENT

Figure 1:
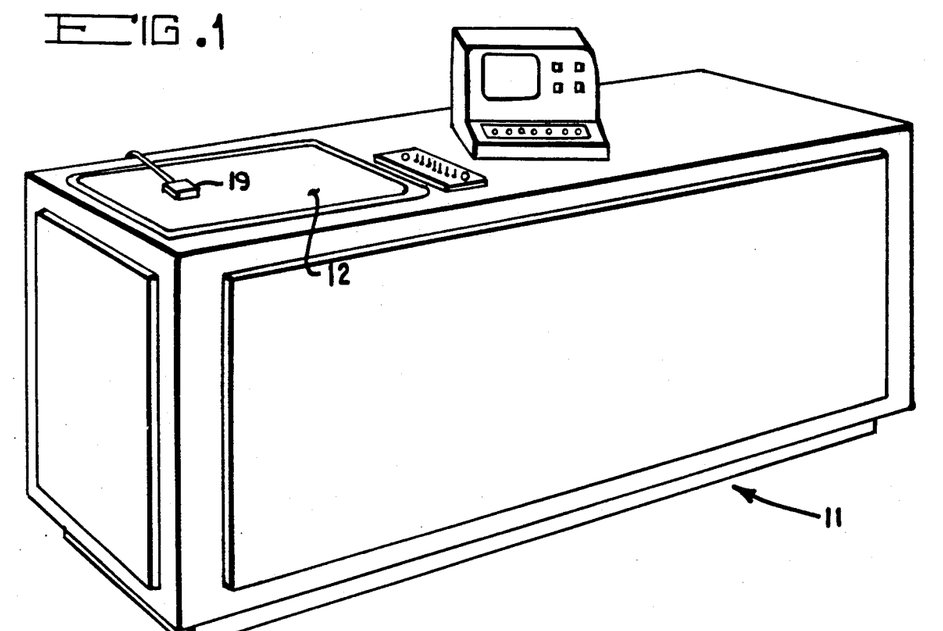
FIG. 1 pictorially illustrates a cartographic display system console and associated apparatus.
Figure 2:
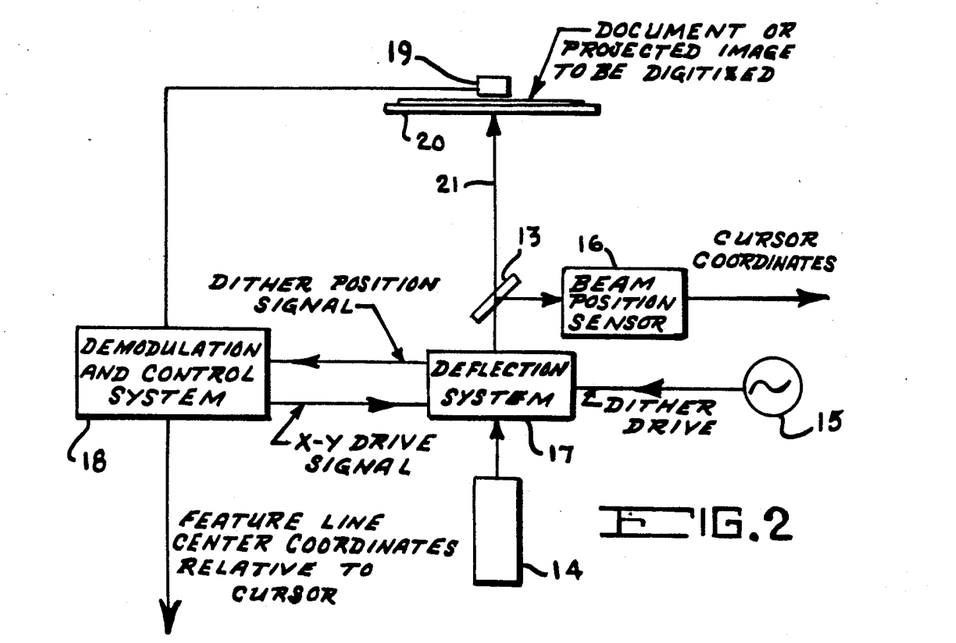
FIG. 2 is a block diagram of the basic interactive cursor system of the invention.

Cartographic display systems for processing maps and similar information sources require the tracing and editing of such documents and subsequent graphic data entry into a digital feature file. FIG. 1 illustrates a cartographic display system of this type including console 11, display work surface 12, cursor sensor element 19 and other associated equipment. Displays of this type to which the invention pertains contain deflectable lasers. The present invention utilizes the deflectable laser beam of such a system in a way that permits the graphic data entry function to be achieved by means of a hand held cursor. A basic interactive cursor system incorporating the principles of the invention is illustrated by FIG. 2. It comprises reference laser 14, deflection system 17, dither oscillator 15, beam position sensor 16, beam splitter 13, screen 20, and demodulation and control system 18. The low power CW laser 14 is focussed onto the screen 20 through a deflection system 17. This system is capable of positioning the beam 21 anywhere on the screen and of applying a small high frequency dither about this average position. The man deflectors and the dither deflectors may be separate units optically in series, or they may be one unit driven by the sum of two signals. A precision beam position sensor 16 reads out the instantaneous beam position to the desired accuracy. The cursor 19 in its simplest form contains a small photodetector which only responds to the laser beam when the beam is striking the screen in front of its limiting aperture. As a result, the photocurrent from the cursor 19 contains information regarding any misalignment between the cursor and dither pattern. This information can be recovered in the demodulation section 18 by comparison with the dither position signal. The resulting cursor signals are used in the control section 18 to adjust the x and y drive signals so that the dither pattern centers on the cursor 19.

If the cursor 19 also contains a second larger detector, it is possible to measure the total power reaching the cursor regardless of pointing error. It is then possible to measure the optical density of a transparent or translucent map placed between the screen and the cursor. The dithering beam and cursor form a manually directed flying spot scanner which can transfer the feature coordinates of a narrow swath of imagery to a digital processor. This data may then be used to determine the exact position of a feature relative to the cursor center. In this way, feature locations may be extracted from a document without data degradation from operator hand jitter.

In addition, the presence of the total power detector allows rejection of positional errors due to dense imagery on the document. A cursor with a single detector cannot discriminate between a reduction in light due to misalignment of the dither pattern and a reduction in light due to obscuration by imagery. Consequently, dense imagery will cause the dither pattern to be slightly pulled away from the cursor center. If a detector measuring total power is used, the signal from the center detector may be normalized by subtracting the power falling outside the center region, as performed by subtraction 59 in FIG. 12. A preferable alternative method is to divide the center detector signal by the total detected power.

The hand-held scanning cursor provides a direct data coordinate interconnection between the display surface and the digital feature file. The cursor is used to interact with the digital feature file to perform interactive editing of the displayed digital feature data. It is also used to perform lineal feature line center coordinate extraction of cartographic data appearing on the display surface by operating either in a manual line following mode or in a semi-automatic line center extraction scanning mode.

Figure 3:
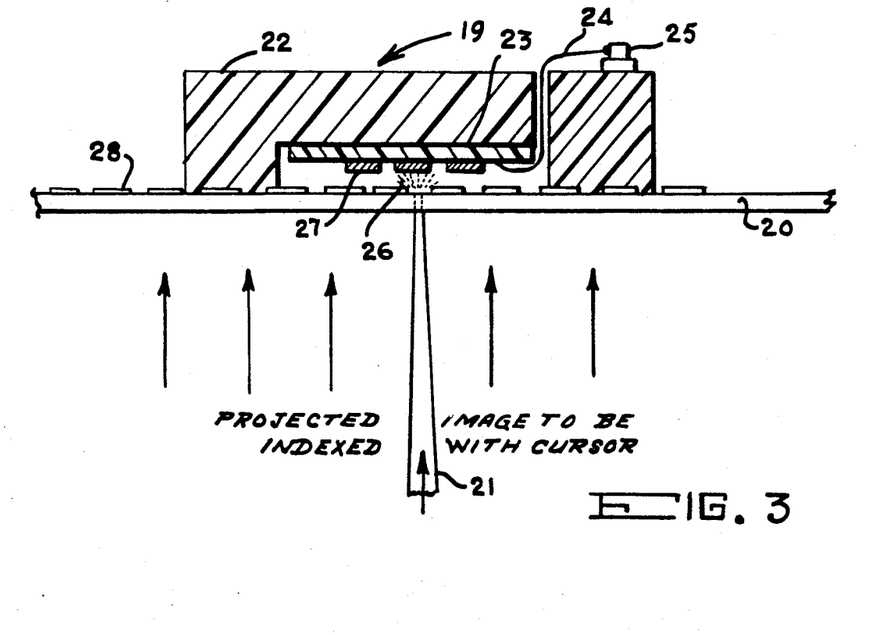
FIG. 3 illustrates in section a cursor in physical relationship to the system screen and laser beam.

FIG. 3 shows the physical relationship of cursor 19 (which is composed of a transparent block 22, detector elements 26, 27, glass substrate 23, leads 24 and terminal block 25) and screen 20 and laser beam 21 of the cartographic system. The translucent document 28 with an image to be indexed is placed on screen 20 or an image to be indexed with the cursor is projected from below as shown.

Figures 4, 5, 7:
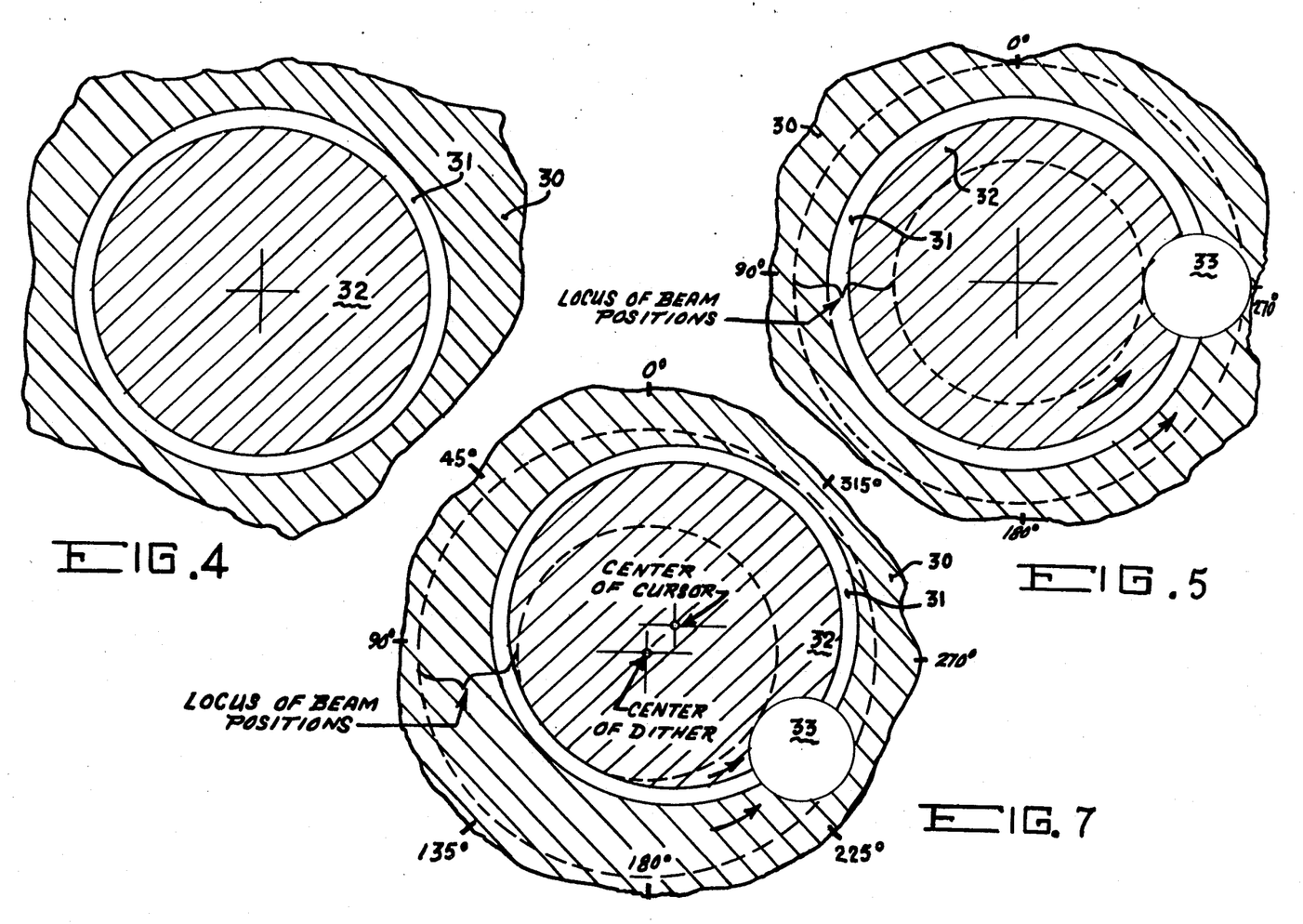
FIG. 4 illustrates a plan view of the detector elements of the cursor of the invention.
FIG. 5 illustrates a circularly dithered beam centered on the detector elements of the cursor.
FIG. 7 illustrates a circularly dithered beam in off center relationship with respect to the detector elements of the cursor.
Figure 6:
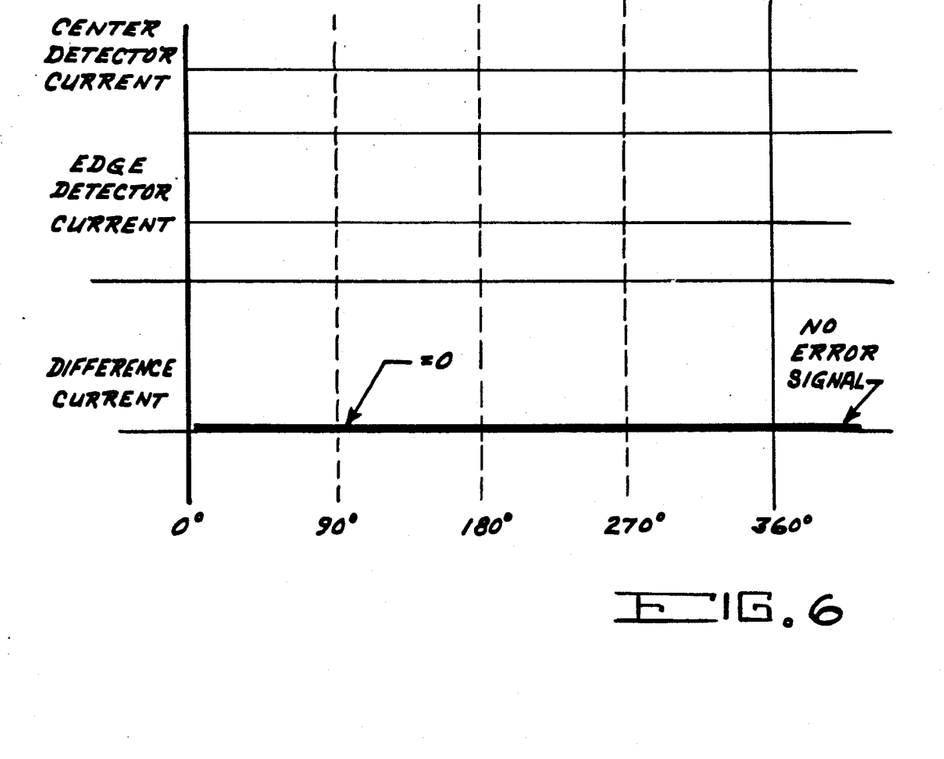
FIG. 6 is a graph showing cursor currents with the dithered beam centered on the detector.
Figure 8:
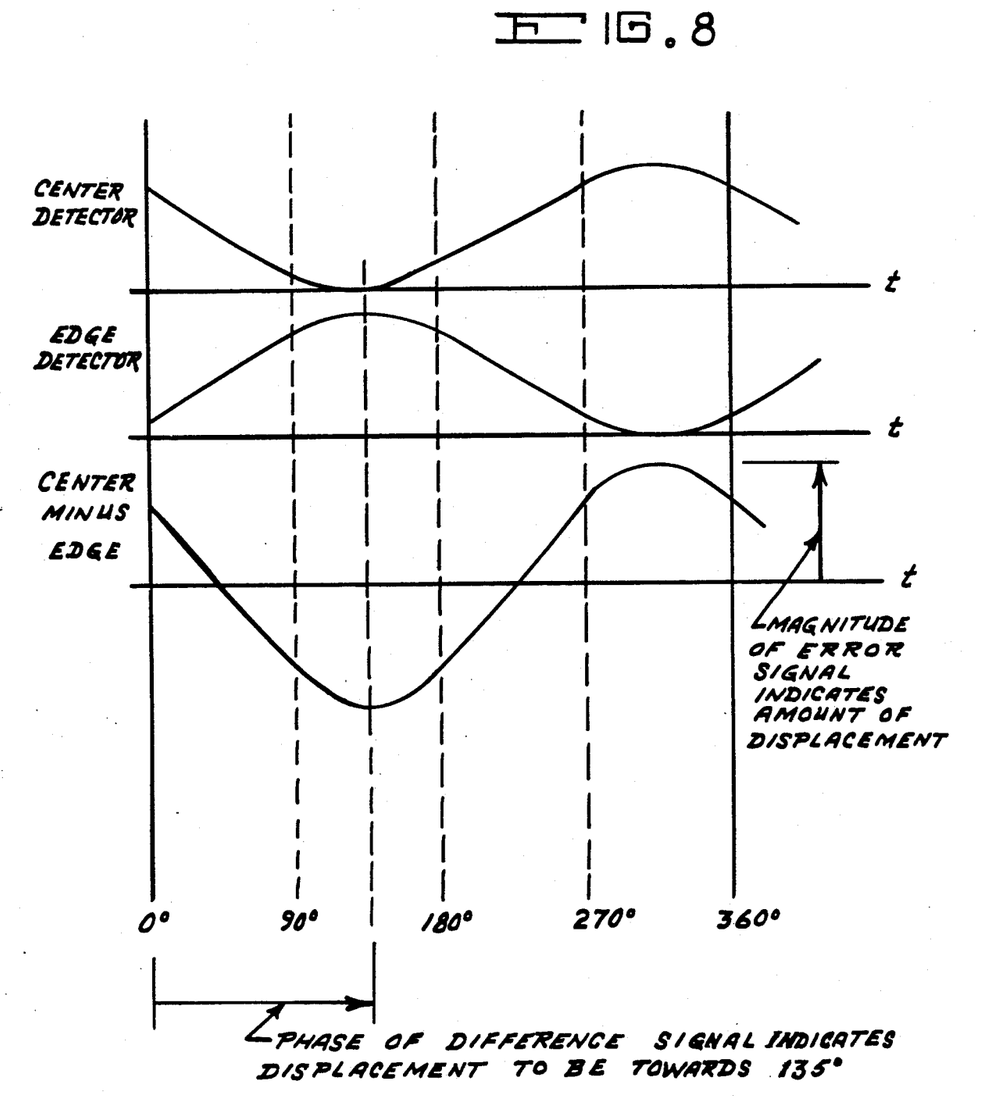
FIG. 8 is a graph showing cursor current with the beam dither not centered with respect to the detector element.

Laser beam misalignment magnitude and direction information is derived from the outputs of cursor 19 in the following manner: In the following description reference is made to FIGS. 4-8. FIG. 4 shows the detector elements of cursor 19 which comprises center detector 32 (0.100 inch typical diameter) and edge detector 30 separated by an annular dividing gap 31 (0.002 inch typical width). FIG. 5 shows the same detector elements together with dithered beam 33. The center of dither in this instance coincides with the center of the center detector 32 with the beam 33 shown in an instantaneous position of 270° and following a locus of beam position having a radius that coincides with the mean radius of the gap 31. FIG. 6 is a graph illustrating cursor currents with the dither centered on the detector. FIG. 7 illustrates the detector elements with the center of dither misaligned and FIG. 8 illustrates cursor current with the beam dither not centered with respect to the detector.

Referring now to FIG. 4, the detector is divided into two zones, center detector 32 and edge detector 30 as shown. In FIG. 5, a focused laser spot 33 is caused to circle at a fixed diameter by the dither deflection system. The dither system may be the same as the main deflection system; it may be a separate set of high frequency x and y deflectors, or it may be a wobbling mirror on a motor shaft. The instantaneous coordinates of the center of the circle are accurately known as is the instantaneous direction that the beam is deflected from the center. Since the spot travels in a circle the amount of the deflection is constant. The radius of the dither circle should be made equal to the mean radius of dividing gap between center and edge detectors.

If the circular dither pattern is centered with respect to the detector, the laser spot will at all times straddle the dividing gap as in the case of FIG. 5. The amount of light received by center and edge detectors will be approximately equal and is constant. The difference in detector currents, as shown in FIG. 6 contains no ac component and hence no error signal.

In FIG. 7 the circular dither is displaced a small amount from the center of the detector. The displacement was arbitrarily chosen to be in the 135° direction using the angle convention shown. The laser spot now is unequally divided between center and edge detectors. At 135° most of the laser power is received by the edge detector, while at 315° most of the power is received by the center detector. At 45° and 225° the power is about equally split. Since the circular motion establishes a relationship between geometric angle and temporal phase, the detector currents as a function of time have the relationship shown in FIG. 8. It is noted that the peak of edge detector current and minimum center detector current occur at 135° of phase. The magnitude of the ac components is proportional to the amount of the displacement.

Figure 9:
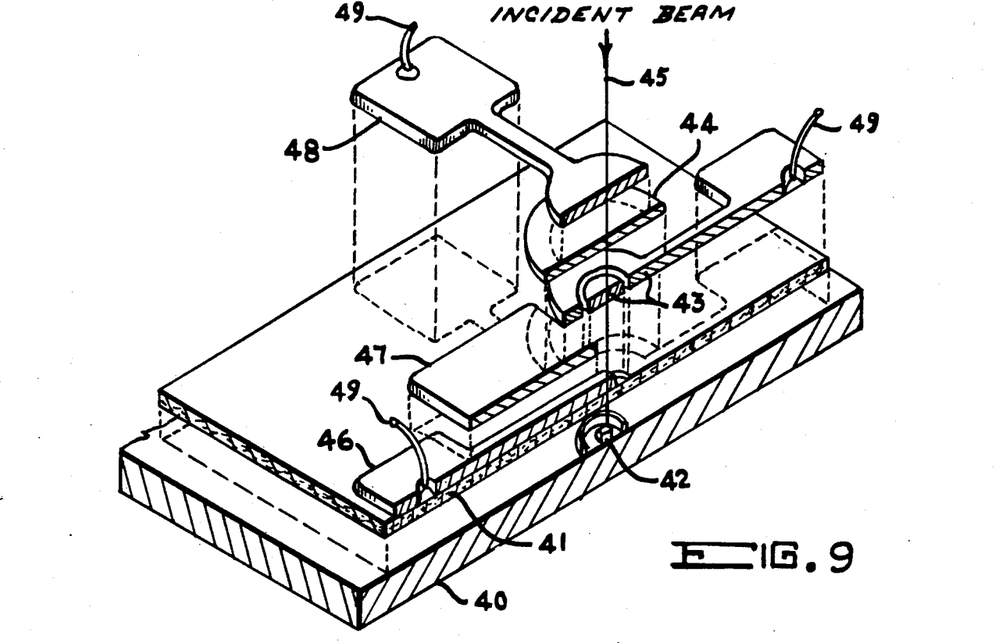
FIG. 9 illustrates one presently preferred embodiment of the hand held cursor of the invention.
Figure 10:
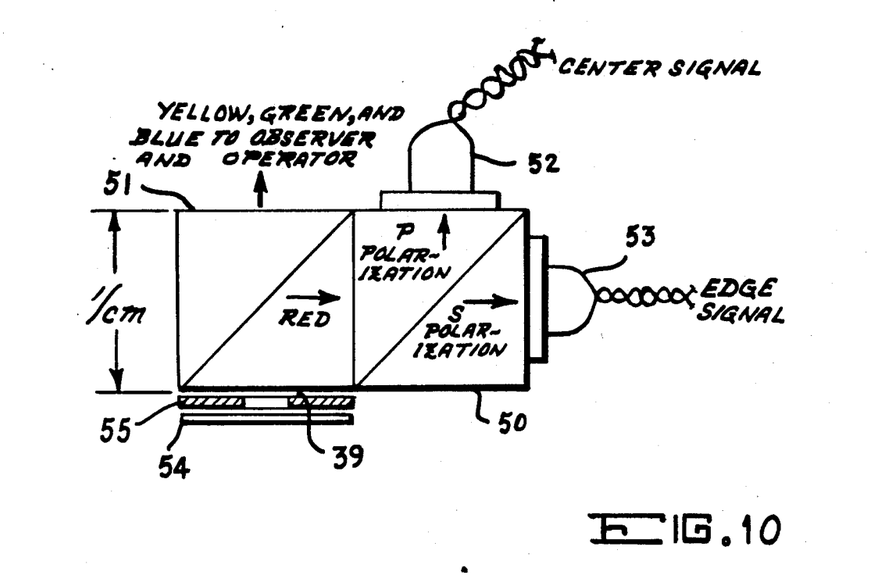
FIG. 10 illustrates an alternative embodiment of the hand held cursor of the invention.

As indicated above the basic cursor design is that of two concentric circular photo detectors with a very narrow gap in between. By way of example, one presently preferred embodiment of the cursor of the invention is illustrated in FIG. 9. The concentric photodetectors are formed by use of two concentric electrodes on one side of a photoconductive film. The center electrode is connected to the outside world through a thin film conductor buried under an insulating layer upon which the outer electrode is deposited. All conductors in this diagram are transparent indium tin-oxide (ITO), all insulators are silicon monoxide (SIO), and the photoconductor is cadmium-zinc-sulphide (CZS). Specifically, having reference to FIG. 9, the device comprises substrate 40, silicon monoxide isolation layer 41, reticle 42, indium-tin oxide conductor element 43, cadmium zinc sulfide photo conductor 44, indum tin oxide conductor 48 and external connections 49. The assembly is illustrated in an inverted position and receives incident beam 45 as shown. The indium tin oxide films are transparent throughout the visible range. The cadmium-zinc-sulfide photoconductor is only sensitive to the blue and green, and only transmits red and orange. In order to make a cursor work with a red beam, a photoconductor must be used that is sensitive to red. Such a photoconductor could be opaque throughout the visible spectrum, making it difficult for the operator to see the image that is to be indexed or digitized. An alternative embodiment of the cursor using two silicon detectors is shown in FIG. 10. This cursor will operate at any wavelength and comprises polarization cube 50, silicon detector 52, 53, dichroic (color separating) cube 51, sheet polarizer 54 and half wavelength waveplate 55. Waveplate 55 may be of mica or mylar and has an aperture 39 (typically 0.10 inch diameter). In operation yellow, green and blue light passes upward to the operator, P polarized red light comes from the aperture 39 and goes to upper detector 52 and S polarized red light comes from the wave plate area surrounding aperture 30 and goes to side detector 53. Polarization of the laser beam is immaterial as the diffuse display screen will depolarize the incident laser beam.

Figure 11:
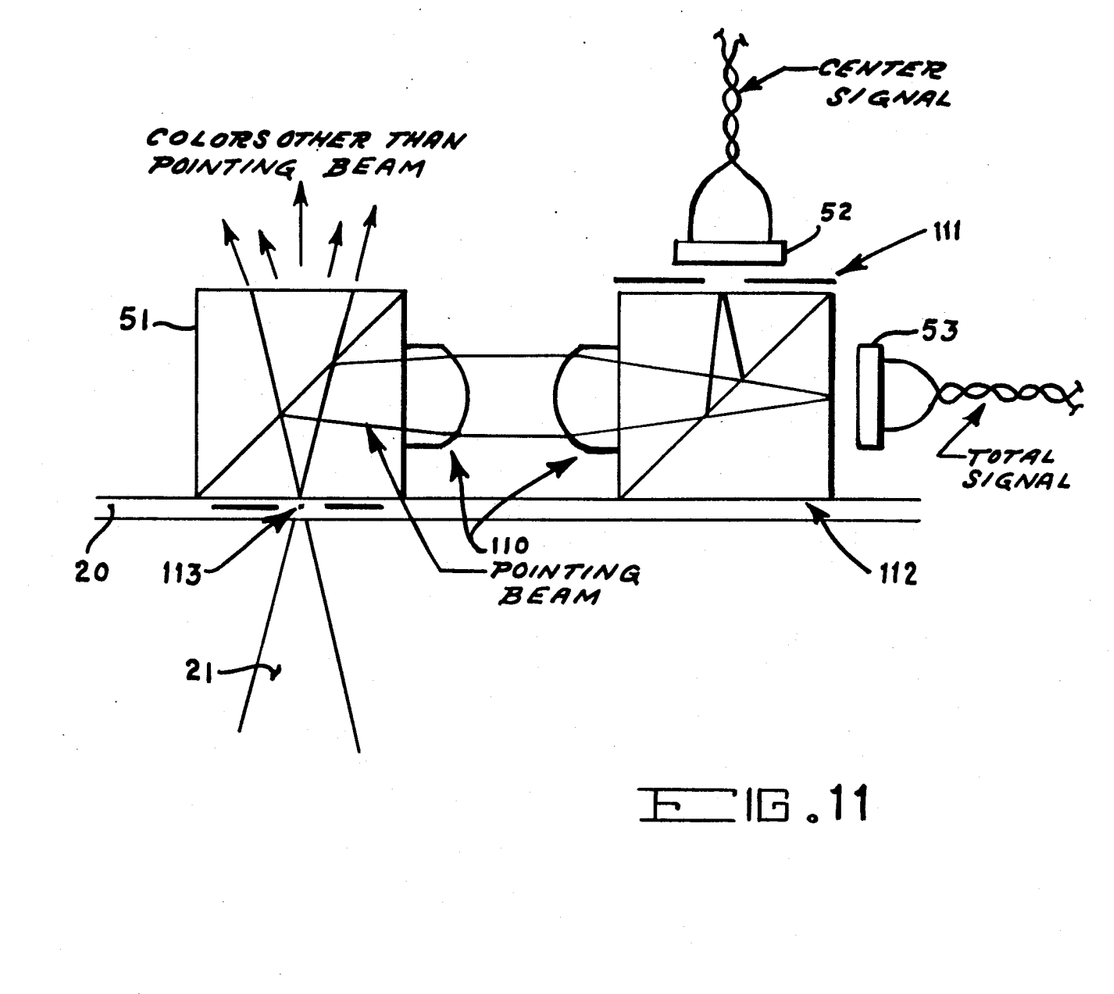
FIG. 11 illustrates another alternative embodiment of the hand held cursor of the invention.

A third embodiment using silicon detectors is shown in FIG. 11. A dichroic cube 51 separates pointing laser light from other colors and directs it to the beam splitter cube 112, which reflects approximately half the laser power toward the center detector and transmits approximately half the power toward the total power detector 53. Lens system 110 images the point where the pointing laser 21 impinges on the display screen 20 onto the center channel aperture plate 111. This plate, which may be formed by photolithography, allows the center channel detector 51 to only receive energy from a circular area typically 0.100 inch in diameter, which is centered with respect to the face dichroic cube 51. A reticle pattern 113 deposited on the bottom of dichroic cube 51 allows the operator to align the cursor with the graphical feature. The center of the reticle pattern must image through the lens system 110 to the center of the aperture plate 111. The reticle pattern must be designed so that it does not block the pointing beam when it is describing its normal circular dither.

The proper dither pattern for the cursor is a circle the diameter of the inner photodetector. This pattern may be generated by applying high frequency sine and cosine signals to the x and y beam deflectors (or to small auxiliary deflectors if the main deflectors are too ponderous to respond). An alternative way is to incorporate a wobbling mirror somewhere in the pointing laser path. This could be a mirror slightly cocked with respect to the shaft of a high speed motor.

Figure 12:
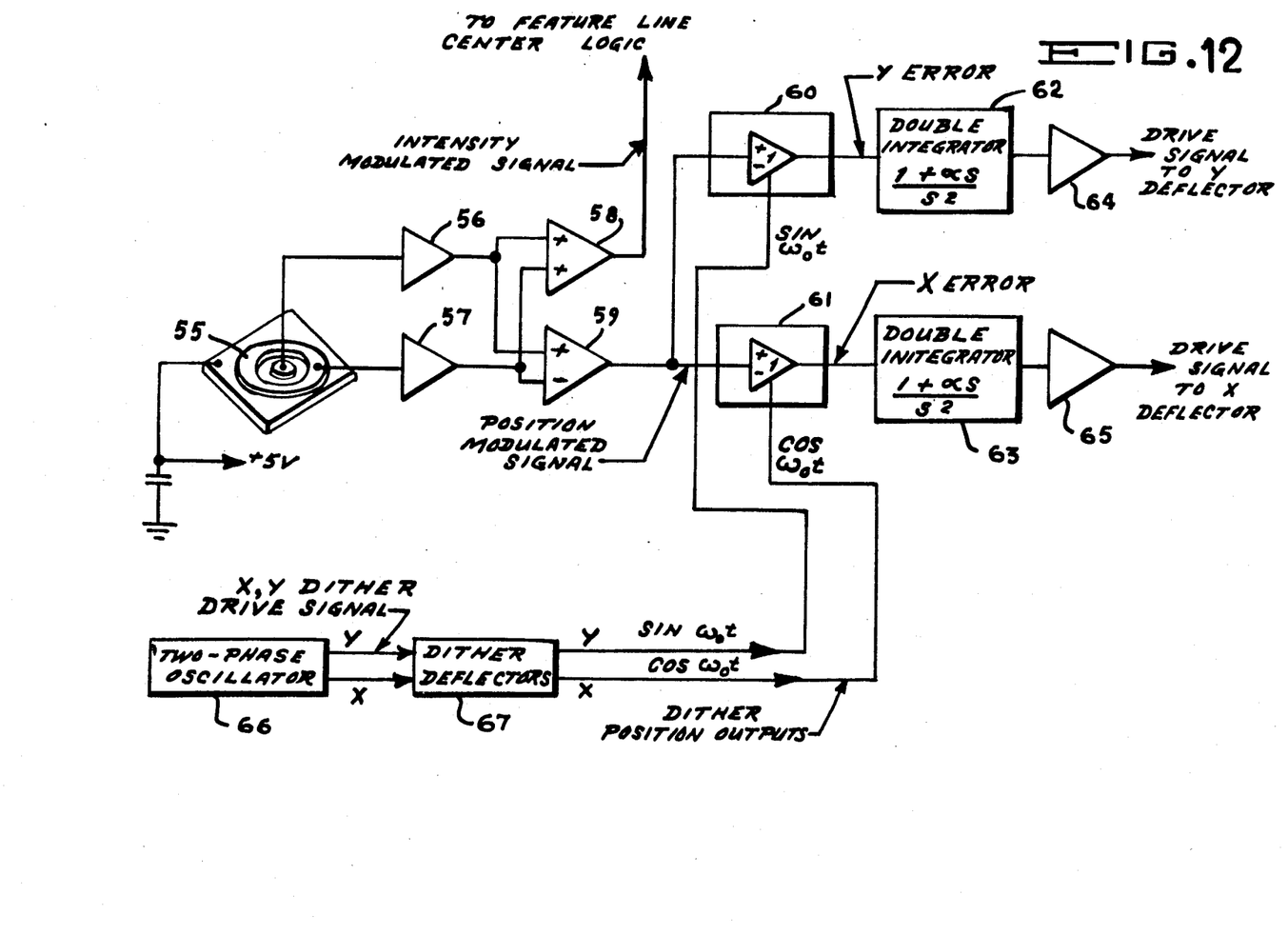
FIG. 12 is a block diagram of the cursor demodulation and control system.

A demodulation and control system suitable for use in the present invention is shown in FIG. 12. This system operates with cursor 55 and comprises preamplifiers 56, 57, amplifiers 58, 59, switching demodulators 60, 61, double integrators 62, 63, output amplifiers 64, 65, two-phase oscillator 66 and dither deflectors 67 connected in the circuit arrangement of FIG. 12. Subtraction of the outer detector photocurrent from that of the inner detector yields a signal indicating instantaneous position of the laser beam, i.e. whether it is within the boundary of the inner detector. Alternatively, the difference amplifier 59 may be replaced with a ratio circuit which divides the signals from preamplifier 56 by the signal from preamplifier 57. The resultant signal is demodulated in switching demodulators that have gains of +1 or −1 depending on the signs of the position signals from the deflectors. The results are x and y error signals, which indicate the misalignment between the cursor center and the circle center. The error signals are integrated twice, compensated for damping, and fed to the main x and y deflectors. This system, with two integrations has the property that the position errors are held to zero even when the cursor is being moved at a constant velocity. The dither position signals used to drive the demodulators can be taken from deflection angle sensors on the deflectors or, if a motor is used, from an angle encoder on the motor shaft.

Figure 13:
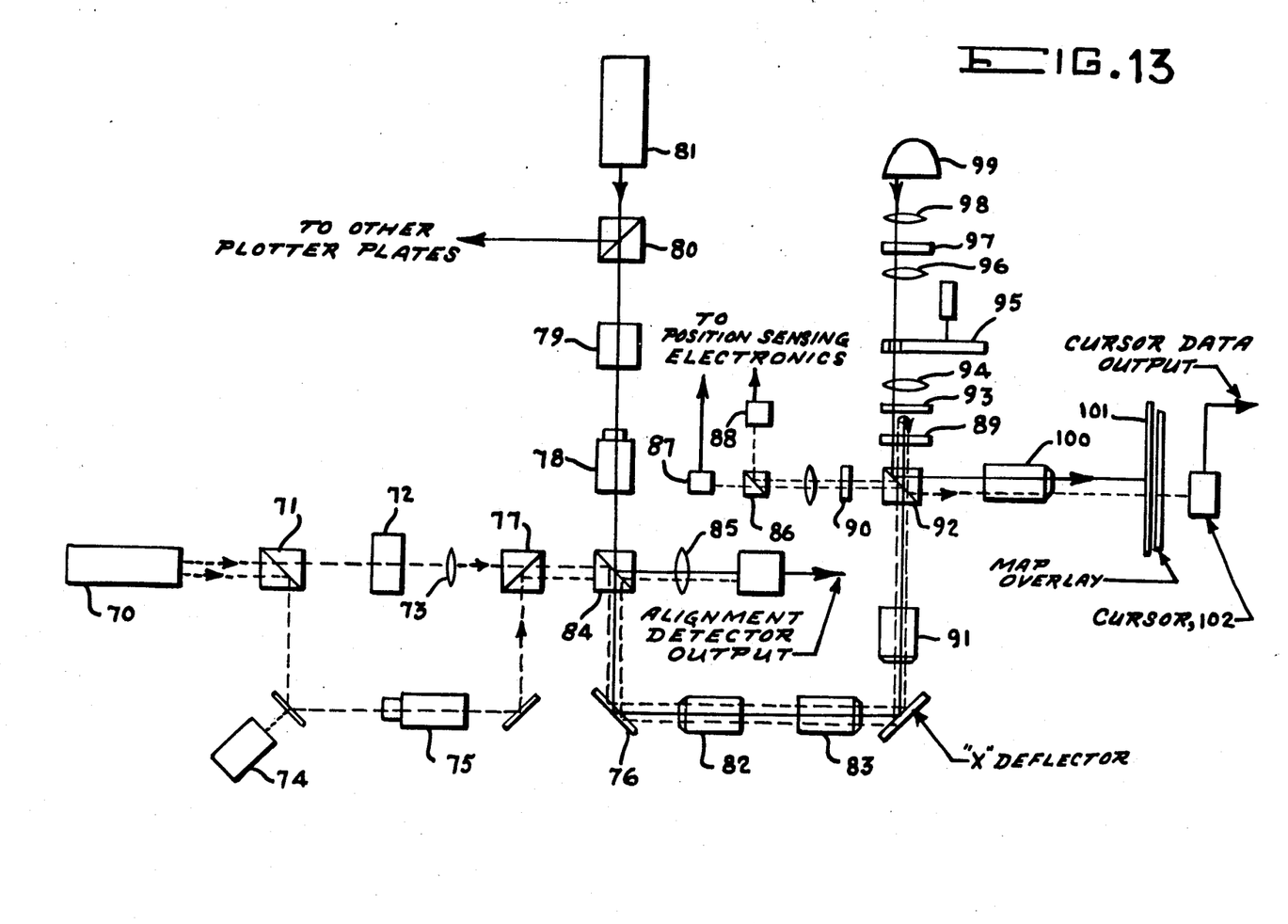
FIG. 13 is a block diagram of an interactive cartographic display and basic writing system including the cursor of the invention.

A graphical data projection display system incorporating the cursor of the invention is shown by FIG. 13 and illustrates the method for obtaining a scanning cursor beam at the work surface. The system comprises reference laser 70, dual reference beam splitter 71, position reference beam frequency shifter 72, transform lens 73, cursor dither deflection mirror 74, zero reference beam expander 75, "Y" deflector 76, reference and writing beam combiner 84, lens 85, dual reference beam combiner 77, beam expander 78, video modulators 79, writing beam splitter 80, writing laser 81 relay lenses 82, 83, focus lens 91, beam separator 92, reference grating 90, dual reference beam separator 86, position reference photodetector 87, zero reference photodetector 88, quarter wavelength retardation plate 89, liquid crystal cell 93, lens 94, color filter wheel 95, lens 96, heat filter 97, lens 98, projection light source 99, projection lens 100, display screen 101 and cursor 102. In operation a portion of the reference laser 70 undergoes a dither scan superimposed on the main galvanometer deflection. The dithered reference beam passes through the beam separator 92, through a quarter wave phase retardation plate 89 and reflects from the surface of the liquid crystal input plane 93. The reflected beam undergoes a 90° polarization rotation after the return pass through the quarter wave plate. It is reflected by the beam separator 92 and is subsequently imaged by the projection lens onto the display screen 101. The hand held cursor at the display screen locks-on to the dithered pointing laser and provides a digital interconnection between the imagery of the display screen and the digital writing system.

While the invention has been described in one presently preferred embodiment it is understood that the words which have been used are words of description rather than words of limitation and that changes within the purview of the appended claims may be made without departing from the scope and spirit of the invention in its broader aspect.

What is claimed is:

1. In an interactive graphic display system having a display screen with a projected or overlaid image, a steerable pointing laser, the beam thereof adapted to scanning said screen in response to a laser beam deflecton circuit, and laser beam position sensing and indicating means, the improvement residing in an interactive cursor system, said interactive cursor system comprising:
    dither means for dithering said laser beam uniformly about its average position in discrete dither pattern,
    a cursor element moveably positionable on the surface of said screen in intercepting relationship with said laser beam, said cursor element including laser beam detecting means, said laser beam detecting means having a geometric configuration functionally related to said dither pattern and producing a modulated output signal responsive to the direction and magnitude of any misalignment of the dither pattern therewith,
    a demodulation circuit processing said modulated output signal and providing direction and magnitude error signals therefrom, and
    a control circuit receiving said direction and magnitude error signals and centering said laser beam on said cursor element in response thereto.

2. An interactive cursor system as defined in claim 1 wherein said laser beam detecting means comprises:
    a disc shaped photosensitive detector element, and
    a peripheral photosensitive detector element surrounding said disc shaped detector element and separated therefrom by an annular space of mean radius r, and wherein
    said dither means dithers said laser beam in a circular pattern of radius r, said laser beam being centered on said cursor element when said dither pattern and said annular space are in register.

3. An interactive cursor system as defined in claim 2 wherein said cursor element is a hand held device.

4. An interactive cursor system as defined in claim 3 wherein said cursor element has visual transparency adapted to provide viewing of said projection display through said cursor element.

5. An interactive cursor system as defined in claim 4 wherein said dither means comprises means for applying sine and cosine signals to said laser beam deflecting circuit.

6. An interactive cursor system as defined in claim 5 wherein said photo sensitive detector elements are comprised of silicon photodetector material.

7. An interactive cursor system as defined in claim 5 wherein said photo sensitive detector elements are comprised of thin film cadmium zinc sulfide photoconductive material.

8. An interactive cursor system as defined in claim 1 wherein said cursor element comprises:
    a dichroic cube, one surface thereof being oriented to intercept said laser beam,
    a polarizaton cube attached to an orthogonal surface thereof,
    a first photo detector on one surface of said polarization cube,
    a second photo detector on an orthogonal surface of said polarization cube,
    an apertured ¼ wavelength plate on the laser beam intercepting surface of said dichroic cube, and
    a polarizer plate covering said ¼ wavelength plate, said dichroic cube passing light in the red portion of the spectrum to said polarization cube and light in the yellow, green and blue portions of the spectrum through said cursor element for observation, said polarization cube passing light transmitted through the aperture of said optical ¼ wavelength plate to said first photo detector and light transmitted through the peripheral region adjacent said aperture to said second photo detector.

9. An interactive cursor system as defined in claim 1 wherein said cursor element comprises:
    a dichroic cube having an alignment reticle pattern on the bottom surface thereof for receiving said laser beam,
    a beam splitter cube adjacent thereto,
    an aperture plate on one surface of said beam splitter cube,
    a center channel photo detector on said aperture plate,
    a total power photo detector on an orthogonal surface of said beam splitter cube, and
    a lens system between said dichroic cube and said beam splitter cube imaging the point where said laser beam impinges on said display screen onto the aperture of said aperture plate, said dichroic cube separating laser light from other colors and directing it to said beam splitter cube.

* * * * *